United States Patent
Derbeko et al.

(10) Patent No.: US 9,235,524 B1
(45) Date of Patent: Jan. 12, 2016

(54) SYSTEM AND METHOD FOR IMPROVING CACHE PERFORMANCE

(75) Inventors: Philip Derbeko, Modiin (IL); Assaf Natanzon, Tel Aviv (IL); Anat Eyal, Tel Aviv (IL); David Erel, Shoham (IL); Daniel S. Cobb, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/341,439

(22) Filed: Dec. 30, 2011

(51) Int. Cl.
G06F 12/00 (2006.01)
G06F 12/08 (2006.01)
G06F 17/30 (2006.01)
G06F 3/06 (2006.01)

(52) U.S. Cl.
CPC ............ G06F 12/0866 (2013.01); G06F 17/30 (2013.01); *G06F 3/06* (2013.01)

(58) Field of Classification Search
CPC ........ G06F 12/0866; G06F 17/30; G06F 3/06
See application file for complete search history.

(56) References Cited

U.S. PATENT DOCUMENTS

| | | | |
|---|---|---|---|
| 5,687,390 A * | 11/1997 | McMillan, Jr. | 710/5 |
| 5,835,928 A | 11/1998 | Auslander et al. | |
| 5,887,146 A | 3/1999 | Baxter et al. | |
| 6,119,209 A * | 9/2000 | Bauman et al. | 711/162 |
| 6,157,991 A | 12/2000 | Arnon | |
| 6,173,369 B1 * | 1/2001 | Nguyen et al. | 711/140 |
| 6,434,681 B1 | 8/2002 | Armangau | |
| 6,496,900 B1 | 12/2002 | McDonald et al. | |
| 6,587,937 B1 | 7/2003 | Jensen et al. | |
| 6,604,171 B1 | 8/2003 | Sade | |
| 6,725,336 B2 | 4/2004 | Cherabuddi | |
| 6,728,836 B1 | 4/2004 | Lambright et al. | |
| 6,757,785 B2 | 6/2004 | Brutman et al. | |
| 7,130,962 B2 | 10/2006 | Garney | |
| 7,293,196 B2 | 11/2007 | Hicken et al. | |
| 7,346,805 B1 | 3/2008 | Scharland et al. | |
| 7,421,538 B2 | 9/2008 | Bita et al. | |
| 7,574,538 B1 * | 8/2009 | Yochai | 710/52 |
| 7,756,130 B1 * | 7/2010 | Lee et al. | 370/389 |
| 7,761,680 B2 | 7/2010 | Ash et al. | |
| 7,766,418 B2 | 8/2010 | Hemmersmeier | |
| 7,769,951 B2 | 8/2010 | Lu et al. | |
| 7,769,952 B2 | 8/2010 | Hashimoto et al. | |
| 7,814,270 B2 | 10/2010 | Shimada | |
| 8,156,301 B1 | 4/2012 | Khandelwal et al. | |
| 8,365,169 B1 | 1/2013 | Watson et al. | |
| 8,627,012 B1 | 1/2014 | Derbeko et al. | |
| 2003/0070043 A1 | 4/2003 | Merkey | |
| 2003/0084252 A1 | 5/2003 | Talagala | |
| 2004/0059869 A1 | 3/2004 | Orsley | |
| 2004/0064829 A1 | 4/2004 | Pallister et al. | |

(Continued)

*Primary Examiner* — Charles Rones
*Assistant Examiner* — Tian-Pong Chang
(74) *Attorney, Agent, or Firm* — Brian J. Colandreo; Mark H. Whittenberger; Holland & Knight LLP

(57) ABSTRACT

A method, computer program product, and computing system for copying a content directory associated with a cache system from a volatile memory system to a non-volatile memory system. A plurality of data requests concerning a plurality of data actions to be taken on an electro-mechanical storage device associated with the cache system are received on the cache system. The content directory on the volatile memory system is updated based, at least in part, upon the plurality of data requests. The plurality of data requests are stored on tracking queue included within the electro-mechanical storage device.

23 Claims, 15 Drawing Sheets

(56) References Cited

U.S. PATENT DOCUMENTS

| | | |
|---|---|---|
| 2004/0117441 A1 | 6/2004 | Liu |
| 2004/0205295 A1 | 10/2004 | O'Connor et al. |
| 2004/0267706 A1 | 12/2004 | Springer et al. |
| 2005/0071379 A1 | 3/2005 | Kekre et al. |
| 2005/0216536 A1 | 9/2005 | Stager et al. |
| 2006/0005189 A1 | 1/2006 | Vega et al. |
| 2006/0143383 A1 | 6/2006 | Zohar et al. |
| 2006/0143390 A1 | 6/2006 | Kottapalli |
| 2006/0168395 A1 | 7/2006 | Deng et al. |
| 2006/0179229 A1 | 8/2006 | Clark et al. |
| 2007/0050540 A1* | 3/2007 | Klein ............................ 711/113 |
| 2007/0061511 A1 | 3/2007 | Faber |
| 2007/0168754 A1* | 7/2007 | Zohar et al. ...................... 714/42 |
| 2007/0198612 A1 | 8/2007 | Prahlad et al. |
| 2007/0220207 A1 | 9/2007 | Black et al. |
| 2008/0098164 A1 | 4/2008 | Lee et al. |
| 2008/0215528 A1 | 9/2008 | Sedlar |
| 2008/0235457 A1 | 9/2008 | Hasenplaugh et al. |
| 2008/0294745 A1 | 11/2008 | Lowery et al. |
| 2008/0320209 A1* | 12/2008 | Lee et al. ....................... 711/103 |
| 2009/0037680 A1 | 2/2009 | Colbert et al. |
| 2009/0055591 A1 | 2/2009 | Miwa et al. |
| 2009/0113149 A1 | 4/2009 | Kondo et al. |
| 2009/0240880 A1 | 9/2009 | Kawaguchi |
| 2009/0313435 A1 | 12/2009 | Thantry et al. |
| 2010/0100696 A1 | 4/2010 | Suzuki |
| 2010/0228919 A1 | 9/2010 | Stabrawa et al. |
| 2010/0235580 A1 | 9/2010 | Bouvier |
| 2010/0250833 A1* | 9/2010 | Trika ............................ 711/103 |
| 2011/0082980 A1 | 4/2011 | Gschwind et al. |
| 2011/0197039 A1 | 8/2011 | Green et al. |
| 2011/0214033 A1 | 9/2011 | Yoshii et al. |
| 2011/0258393 A1 | 10/2011 | Flower et al. |
| 2011/0264845 A1 | 10/2011 | Choi |
| 2012/0005468 A1 | 1/2012 | Yu |
| 2012/0096460 A1 | 4/2012 | Sekiguchi |
| 2012/0173653 A1 | 7/2012 | Bland |
| 2012/0221785 A1 | 8/2012 | Chung et al. |
| 2012/0239860 A1* | 9/2012 | Atkisson et al. ............... 711/103 |
| 2012/0254131 A1 | 10/2012 | Al Kiswany et al. |
| 2012/0284234 A1 | 11/2012 | Mashtizadeh et al. |
| 2012/0324443 A1 | 12/2012 | Low et al. |
| 2013/0024920 A1 | 1/2013 | Rodriguez |
| 2013/0318051 A1 | 11/2013 | Kumar et al. |

* cited by examiner

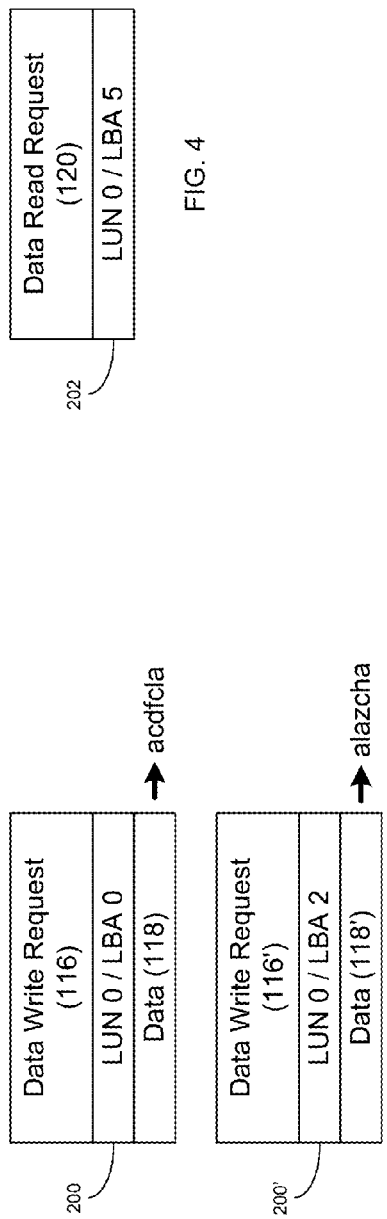

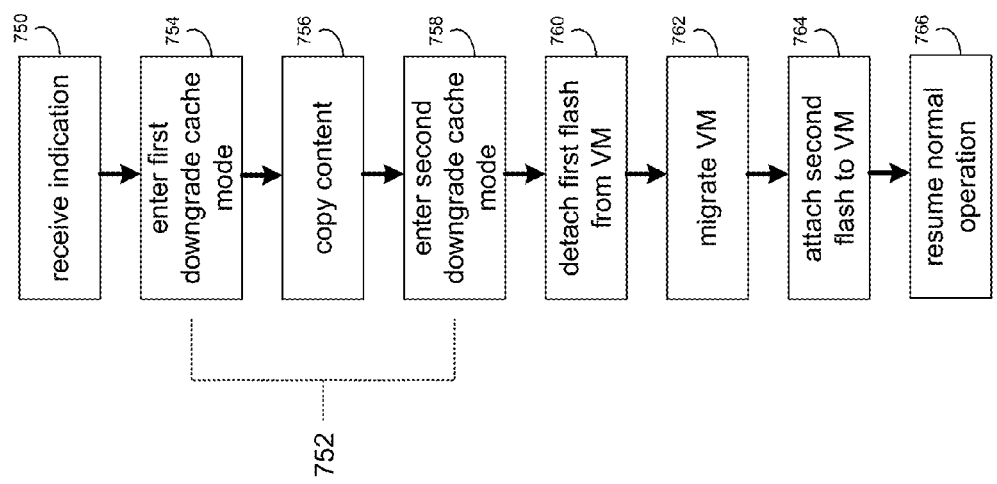

SYSTEM AND METHOD FOR IMPROVING CACHE PERFORMANCE

TECHNICAL FIELD

This disclosure relates to cache memory systems and, more particularly, to systems and methods for improving the performance of cache memory systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes copying a content directory associated with a cache system from a volatile memory system to a non-volatile memory system. A plurality of data requests concerning a plurality of data actions to be taken on an electro-mechanical storage device associated with the cache system are received on the cache system. The content directory on the volatile memory system is updated based, at least in part, upon the plurality of data requests. The plurality of data requests are stored on tracking queue included within the electro-mechanical storage device.

One or more of the following features may be included. Upon detecting a failure event, the content directory on the non-volatile memory system may be updated based, at least in part, upon the plurality of data requests stored upon the electro-mechanical storage device. The tracking queue included within the electro-mechanical storage device may be flushed. The cache system may be a flash memory cache system. The non-volatile memory system may be a flash memory device and the volatile memory system may be a random access memory device. The electro-mechanical storage device may be included within a storage array. The content directory may be configured to associate data stored within the cache system with data stored within the electro-mechanical storage device.

In another implementation, a computer program product resides on a computer readable medium that has a plurality of instructions stored on it. When executed by a processor, the instructions cause the processor to perform operations including copying a content directory associated with a cache system from a volatile memory system to a non-volatile memory system. A plurality of data requests concerning a plurality of data actions to be taken on an electro-mechanical storage device associated with the cache system are received on the cache system. The content directory on the volatile memory system is updated based, at least in part, upon the plurality of data requests. The plurality of data requests are stored on tracking queue included within the electro-mechanical storage device.

One or more of the following features may be included. Upon detecting a failure event, the content directory on the non-volatile memory system may be updated based, at least in part, upon the plurality of data requests stored upon the electro-mechanical storage device. The tracking queue included within the electro-mechanical storage device may be flushed. The cache system may be a flash memory cache system. The non-volatile memory system may be a flash memory device and the volatile memory system may be a random access memory device. The electro-mechanical storage device may be included within a storage array. The content directory may be configured to associate data stored within the cache system with data stored within the electro-mechanical storage device.

In another implementation, a computing system includes at least one processor and at least one memory architecture coupled with the at least one processor, wherein the computing system is configured to perform operations including copying a content directory associated with a cache system from a volatile memory system to a non-volatile memory system. A plurality of data requests concerning a plurality of data actions to be taken on an electro-mechanical storage device associated with the cache system are received on the cache system. The content directory on the volatile memory system is updated based, at least in part, upon the plurality of data requests. The plurality of data requests are stored on tracking queue included within the electro-mechanical storage device.

One or more of the following features may be included. Upon detecting a failure event, the content directory on the non-volatile memory system may be updated based, at least in part, upon the plurality of data requests stored upon the electro-mechanical storage device. The tracking queue included within the electro-mechanical storage device may be flushed. The cache system may be a flash memory cache system. The non-volatile memory system may be a flash memory device and the volatile memory system may be a random access memory device. The electro-mechanical storage device may be included within a storage array. The content directory may be configured to associate data stored within the cache system with data stored within the electro-mechanical storage device.

In another implementation, a computer-implemented method includes updating a content directory stored within a volatile memory system on a server computer/controller. Data requests are stored within a tracking queue located within a data array. The data array is notified that the content directory is going to be copied from the volatile memory system to a non-volatile memory system. The tracking queue is marked to indicate the latest data request processed. Upon completion of the marking process, the server computer/controller is notified that the marking process has been completed. The content directory is copied from the volatile memory system to the non-volatile memory system.

One or more of the following features may be included. Upon completion of the copying process, the data array may be notified that the copying process is complete. The content of the tracking queue may be deleted prior to the mark. The non-volatile memory system may be a flash memory device and the volatile memory system may be a random access memory device. The data array may include at least one electro-mechanical storage device.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a data write request for use with the data caching process of FIG. 1;

FIG. 4 is a diagrammatic view of a data read request for use with the data caching process of FIG. 1;

FIG. 5 is a diagrammatic view of a content directory for use with the data caching process of FIG. 1;

FIG. 14 is a sixth flow chart of the data caching process of FIG. 1.

Like reference symbols in the various drawings indicate like elements.

DETAILED DESCRIPTION OF THE PREFERRED EMBODIMENTS

Figure 1:
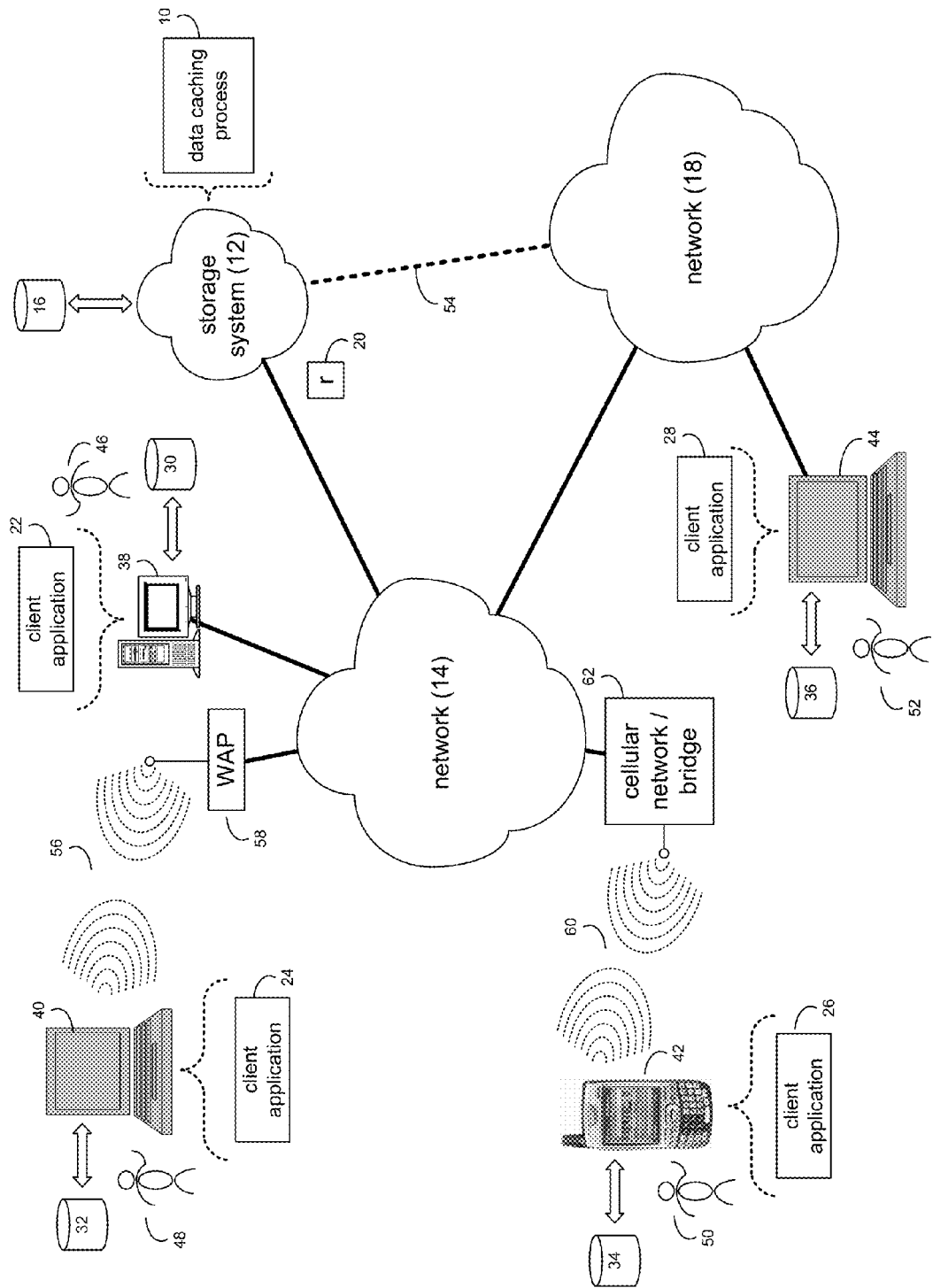
FIG. 1 is a diagrammatic view of a storage system and a data caching process coupled to a distributed computing network.

General Information:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

System Overview:

Referring to FIG. 1, there is shown data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data caching process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Data Caching Process:

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
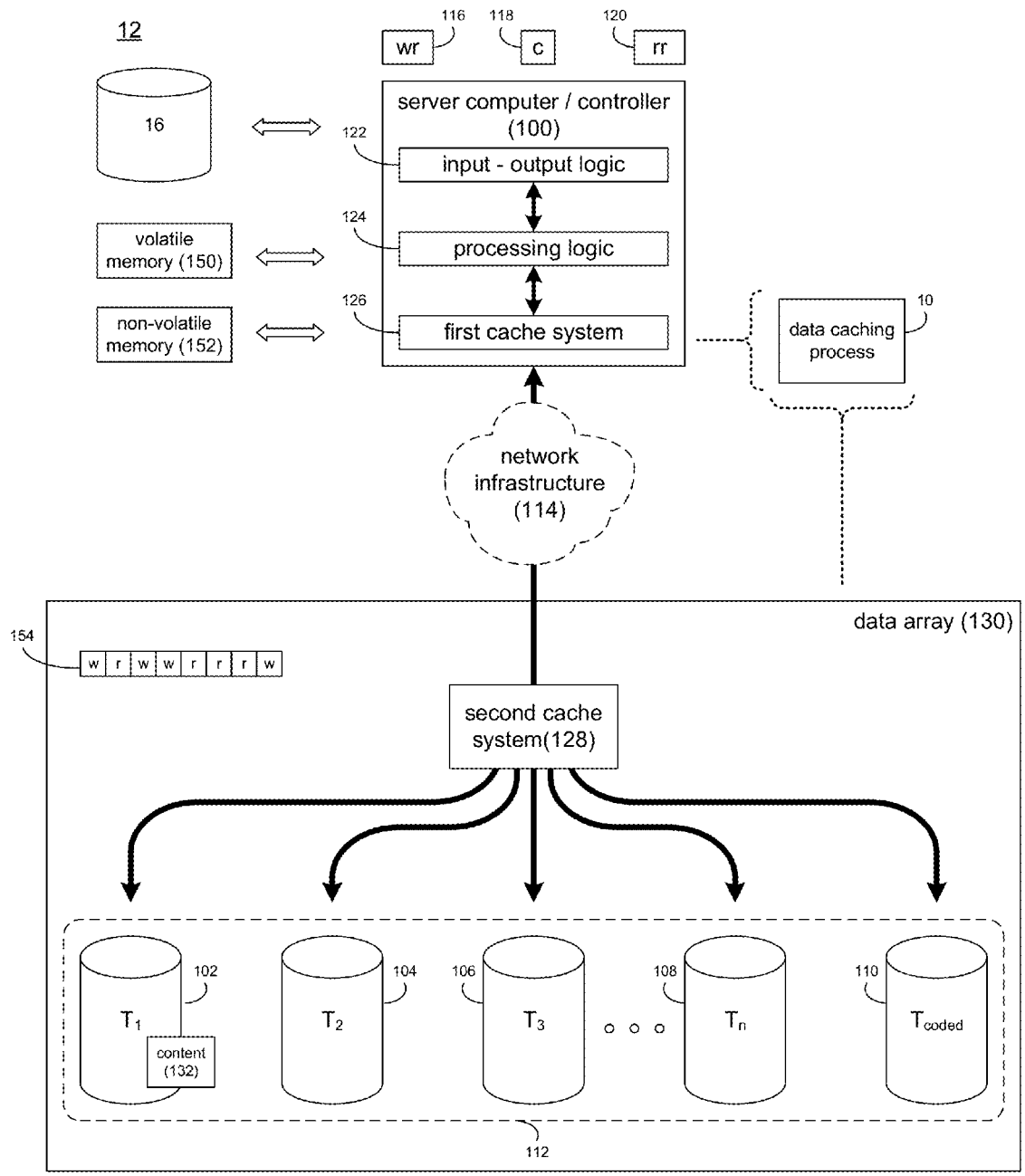
FIG. 2 is a diagrammatic view of the storage system of FIG. 1.

Referring also to FIG. 2, storage system 12 may include a server computer/controller (e.g. server computer/controller 100), and a plurality of storage targets $T^{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data caching process 10. The instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of data requests (e.g., data request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced. As will be described below in greater detail, second cache system 128 may be a content-aware cache system.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data caching process 10 may be executed by one or more processors (not shown) and one or more memory architectures (not shown) included within data array 130.

Referring also to FIGS. 3-4, data request 20 (e.g. data read request 116 and/or data write request 120) may be processed by server computer/controller 100 to extract pertinent information concerning these data requests.

When data request 20 is a data write request (e.g., write request 116), write request 116 may include content 118 to be written to data array 130. Additionally, write request 116 may include a storage address 200 that defines the intended storage location within storage array 130 at which content 118 is to be stored. For example, storage address 200 may define a particular logical unit within data array 130 (e.g., a LUN or Logical Unit Number) and a particular storage address within that specific logical unit (e.g., an LBA or Logical Block Address) for storing content 118.

Concerning read request 120, these requests do not include any content to be written to data array 130, as these are read requests and concern content to be read from data array 130. Read request 120 may include a storage address 202 that defines the storage location within storage array 130 from which content is to be retrieved. For example, storage address 202 may define a particular logical unit within data array 130 (e.g., a LUN or Logical Unit Number) and a particular storage address within that specific logical unit (e.g., an LBA or Logical Block Address) for retrieving the content sought from data array 130.

As will be discussed below in greater detail and referring also to FIG. 5, data caching process 10 may maintain content directory 250, which may be used to locate various pieces of content within first cache system 126. In one particular embodiment of content directory 250, content directory 250 may include plurality of entries 252, wherein each of these entries may identify: data array storage address 200/202 (e.g. a logical storage unit and a storage address at which a specific piece of previously-written content is located within storage array 130); first cache address 254 (e.g., the location within first cache system 126 at which the specific piece of previously-written content is also located), and content identifier 256 for the specific piece of previously-written content. Accordingly, content directory 250 may identify the location of specific pieces of content included within first cache system 126 and their corresponding pieces of data within data array 130, as well as a content identifier that uniquely identifies the specific piece of content.

Content identifier 256 may be used in a content-aware caching system and may, specifically, be a mathematical representation of the specific piece of previously-written content that may allow e.g. server computer/controller 100 to quickly determine whether two pieces of previously-written content are identical, as identical pieces of content would have identical content identifiers. In one particular embodiment, content identifier 256 may be a hash function (e.g., a cryptographic hash) of the previously-written content. Accordingly, through the use of a content-aware caching system, duplicate data entries within first cache system 126 and/or second cache system 128 may be quickly identified, avoided, and/or eliminated.

As is known in the art, a hash function is an algorithm/subroutine that maps large data sets to smaller data sets. The values returned by a hash function are typically called hash values, hash codes, hash sums, checksums or simply hashes. Hash functions are mostly used to accelerate table lookup or data comparison tasks such as e.g., finding items in a database and detecting duplicated or similar records in a large file.

General Read Request Processing:

During operation of server computer/controller 100, data caching process 10 may receive read request 120 on first cache system 126, wherein read request 120 identifies previously-written content (as defined by storage address 202) included within data array 130.

For example, assume that user 46 is using client application 22 to access data (i.e. content 132) that is currently being stored on data array 130. Accordingly, client application 22 may generate read request 120 which, as discussed above, may define a particular logical unit within data array 130 (e.g., a LUN or Logical Unit Number) and a particular storage address within that specific logical unit (e.g., an LBA or Logical Block Address) for retrieving content 132 sought from data array 130 by client application 22.

Assume that read request 120 defines LUN0/LBA5 as the location of content 132 within data array 130. Upon receiving read request 120, data caching process 10 may compare the location of content 132 within data array 130 (namely LUN0/LBA5) with each of the plurality of entries 252 defined within content directory 250 to determine if a copy of content 132 is locally available (i.e., cached) within first cache system 126. If LUN0/LBA5 was defined within content directory 250 (meaning that a local cached copy of content 132 is present/available within first cache system 126), that particular entry would also define a corresponding first cache address (e.g. first cache address 254) within first cache system 126 at which content 132 would be locally-available and retrievable from the first cache system 126. Conversely, in the event that LUN0/LBA5 is not defined within content directory 250 (meaning that a local cached copy of content 132 is not present/available within first cache system 126), data caching process 10 may need to obtain content 132 identified in read request 120 from data array 130.

In this particular example, since LUN0/LBA5 is not defined within content directory 250, a local cached copy of content 132 is not present/available within first cache system 126 and data caching process 10 will be need to obtain content 132 from data array 130.

Once content 132 is obtained by data caching process 10 from data array 130, data caching process 10 may store content 132 within first cache system 126 and may provide content 132 to client application 22, thus satisfying read request 120. Additionally, content directory 250 may be amended by data caching process 10 to include an entry (e.g., entry 258) that defines the data array storage address 200/202 (e.g. LUN0/LBA5); first cache address 254 (e.g., 111110), and content identifier 256 (e.g., ablccba) for content 132.

As discussed above, data array 130 may include second cache system 128. Accordingly, data caching process 10 may execute the above-described functionality with respect to second cache system 128.

General Write Request Processing:

During operation of server computer/controller 100, data caching process 10 may receive write request 116 on first cache system 126, wherein write request 116 identifies new content (e.g., content 118) to be written to data array 130.

For example, assume that user 46 is using client application 22 to create content (i.e. content 118) that is to be stored on data array 130. Accordingly, client application 22 may generate write request 116 which, as discussed above, may define a particular logical unit within data array 130 (e.g., a LUN or Logical Unit Number) and a particular storage address within that specific logical unit (e.g., an LBA or Logical Block Address) for storing content 118 within data array 130.

As discussed above and depending on the manner in which first cache system 126 is configured, data caching process 10 may immediately write content 118 to data array 130 (if first cache system 126 is configured as a write-through cache) or may subsequently write content 118 to data array 130 (if first cache system 126 is configured as a write-back cache).

Assuming that first cache system 126 in this example is configured as a write-through cache, data caching process 10 may immediately write content 118 to LUN0/LBA0 within data array 130 (as defined within write request 116). Additionally, data caching process 10 may locally-store content 118 within first cache system 126 and may amend content directory 250 to include an entry (e.g., entry 260) that defines the data array storage address 200/202 (e.g. LUN0/LBA0); first cache address 254 (e.g., 001011), and content identifier 256 (e.g., acdfcla) for content 118.

As discussed above, data array 130 may include second cache system 128. Accordingly, data caching process 10 may execute the above described functionality with respect to second cache system 128.

Content Aware Caching

As discussed above, content directory 250 may include a content identifier 256 that may be used in a content-aware caching system. A typical example of content identifier 256 may include but is not limited to a hash function of the content that content identifier 256 is associated with. Accordingly, through the use of content identifier 256 within a content-aware caching system, duplicate data entries within first cache system 126 and/or second cache system 128 may be quickly identified, avoided, and/or eliminated.

For example, upon receiving write request 116 and content 118, data caching process 10 may generate content identifier 256 for content 118. As discussed above, content identifier 256 generated for the content (i.e., content 118) identified within write request 116 may be a hash function (e.g., a cryptographic hash) of content 118.

Assume for illustrative purposes that write request 116 includes storage address 200 that defines the intended storage location for content 118 as LUN0/LBA0. Accordingly, upon receiving write request 116, data caching process 10 may generate content identifier 256 for content 118. Assume for illustrative purposes that data caching process 10 generates a hash of content 118, resulting in the generation of content identifier 256 (namely hash value acdfcla).

This newly-generated content identifier 256 (i.e. acdfcla) associated with content 118 may be compared to each of the other content identifiers (namely abalaby, alazchb, abalabz, alazcha) included within content directory 250 for first cache system 126 to determine if the newly-generated content identifier 256 (i.e. acdfcla) matches any of the other content identifiers (namely abalaby, alazchb, abalabz, alazcha) included within content directory 250.

As discussed above, each entry of the plurality of entries 252 included within content directory 250 is associated with a unique piece of content included within (in this example) first cache system 126. Accordingly, each unique content identifier included within content directory 250 may be associated with a unique piece of content written to (in this example) first cache system 126.

If, when performing this comparison, data caching process 10 does not identify a content identifier (i.e., abalaby, alazchb, abalabz, alazcha) within content directory 250 that matches the above-described, newly-generated content identifier (i.e. acdfcla), data caching process 10 may write content 118 to (in this example) first cache system 126 and may provide a copy of content 118 to data array 130 for storage within data array 130. Additionally, data caching process 10 may modify content directory 250 to include a new entry (i.e., entry 260) that defines the newly-generated content identifier (i.e. acdfcla), the location of content 118 within (in this example) first cache system 126 (i.e., 001011), and the location of content 118 within data array 130 (i.e., LUN0/LBA0).

If, when performing this comparison, data caching process 10 identified a content identifier within content directory 250 that matched the above-described, newly-generated content identifier (i.e. acdfcla), data caching process 10 would perform differently.

To illustrate how data caching process 10 would react if it found a matching content identifier, further assume for illustrative purposes that a second write request (i.e., write request 116') includes storage address 200' that defines the intended storage location for content 118' as LUN0/LBA2. Accordingly, upon receiving write request 116', data caching process 10 may generate content identifier 256 for content 118'. Assume for illustrative purposes that data caching process 10 generates a hash of content 118', resulting in the generation of content identifier 256 (namely hash value alazcha).

This newly-generated content identifier 256 (i.e. alazcha) associated with content 118' may be compared to each of the other content identifiers (namely abalaby, alazchb, abalabz, alazcha) included within content directory 250 for (in this example) first cache system 126 to determine if the newly-generated content identifier 256 (i.e. alazcha) matches any of the other content identifiers (namely abalaby, alazchb, abalabz, alazcha) included within content directory 250.

If, when performing this comparison, data caching process 10 does identify a content identifier (namely alazcha) within content directory 250 that matches the above-described, newly-generated content identifier (i.e. alazcha), data caching process 10 may perform a couple of functions.

For example, data caching process 10 may modify the entry (i.e., entry 262) within content directory 250 that is associated with the matching content identifier (i.e., alazcha) to include storage address 200' that defines the intended storage location for content 118' (i.e., LUN0/LBA2 within data array 130), thus generating modified entry 262'. Accordingly, modified entry 262' identifies that the pieces of content that are currently stored at LUN4/LBA7 and LUN0/LBA2 within data array 130 are identical. Accordingly, a single piece of cached content (located at first cache address 010111 within, in this example, first cache system 126) may be used as a local cached copy for both pieces of content stored on data array 130.

While the system is described above as modifying entry 262 by adding a second LUN/LBA designation to generate modified entry 262', this is for illustrative purposes only and is not intended to be a limitation of this disclosure, as other configurations are possible. For example, sub-tables/sub-entries may be utilized to show the manner in which multiple LUNs/LBAs are mapped to a single piece of content within, for example, first cache system 126.

As discussed above, data array 130 may include second cache system 128. Accordingly, data caching process 10 may execute the above-described content aware functionality with respect to second cache system 128.

Cache Recovery

Typically, content directory 250 is stored within some form of volatile memory system (e.g., volatile memory system 150) within e.g. server computer/controller 100. Since content directory 250 is essentially a "roadmap" to the content stored within e.g. first cache system 126, in the event that e.g. server computer/controller 100 crashes or restarts, access to the content stored within e.g. first cache system 126 will be eliminated, as the location of the individual pieces of content within e.g. first cache system 126 may be unknown.

Figure 6:
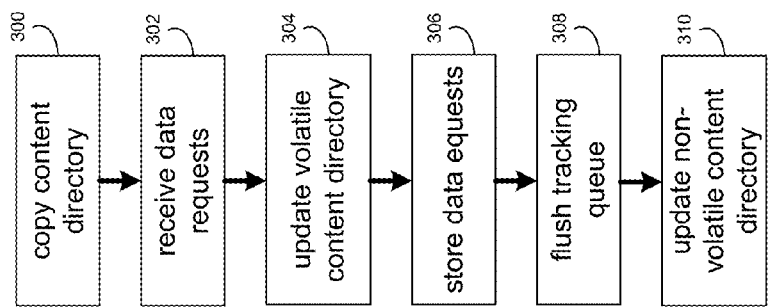
FIG. 6 is a first flow chart of the data caching process of FIG. 1.

Accordingly and referring also to FIG. 6, data caching process 10 may be configured to copy 300 content directory 250 associated with first cache system 126 from volatile memory system 150 (e.g., a random access memory system) to non-volatile memory system 152 (e.g., a flash-based memory system) included within server computer/controller 100, thus establishing a backup copy of content directory 250.

As discussed above, data caching process 10 may receive 302, on e.g., cache system 126, a plurality of data requests (e.g., data write request 116 and data read request 120) that concern a plurality of data actions (e.g., read actions and write actions) to be taken on an electro-mechanical storage device associated with first cache system 126. For example and as discussed above, data caching process 10 may receive 302 read and write requests concerning data to be read from and written to the electro-mechanical storage devices include within data array 130.

During normal operation, data caching process 10 may update 304 content directory 250 residing on volatile memory system 150 based, at least in part, upon the plurality of data requests received 302 by data caching process 10. For example, in the event that the data request received 302 is a data read request, data caching process 10 may update 304 content directory 250 to reflect any changes made to the content of e.g. first cache system 126 (as discussed above). Additionally, in the event that the data request received 302 is a data write request, data caching process 10 may update 304 content directory 250 to reflect the newly-added content within e.g. first cache system 126 (as discussed above). Additionally and for this example, assume that first cache system 126 is a write-through cache and, therefore, data caching process 10 immediately writes any content associated with data write requests to data array 130.

Further, data caching process 10 may store 306 a copy of the plurality of data requests received 302 in a tracking queue (e.g., tracking queue 154) included within data array 130. For example, as each data request is processed by data caching process 10, data caching process 10 may store 306 the received data request within tracking queue 154, which may be included within one or more of the electro-mechanical storage devices included within data array 130.

Data caching process 10 may continue to store 306 the data requests received 302 until e.g., tracking queue 154 is full (e.g., 1,000 data requests) or until a defined period of time has passed (e.g., 1,000 milliseconds). Once one of these events occurs, data caching process 10 may copy 300 this newly-updated content directory 250 associated with cache system 126 from volatile memory system 150 to non-volatile memory system 150, thus generating an updated backup copy of content directory 250. Further, data caching process 10 may flush 308 tracking queue 154, thus restarting the tracking process. Accordingly, data caching process 10 may be configured so that tracking queue 154 only contains a copy of all of the data requests received 302 by data caching process 10 after the latest version of content directory 250 was copied 300 from volatile memory system 150 to non-volatile memory system 152.

Assume for illustrative purposes that server computer/controller 100 crashes (e.g. due to a power failure event or a software event) and is subsequently restarted. Further, assume for this example that first cache system 126 utilizes a flash-based (i.e. non-volatile) memory system. Accordingly, while the actual content included within first cache system 126 would survive the above-described crash, content directory 250 (which is stored in volatile memory 150) would not, resulting in a cold cache, as all of the content within first cache system 126 would be non-accessible.

Upon detecting the restart of server computer/controller 100, data caching process 10 may update 310 the previously-copied version of content directory 250 (which was copied 300 by data caching process 10 from volatile memory 150 to non-volatile memory 152) based, at least in part, upon the plurality of data requests stored within tracking queue 154 on data array 130.

As discussed above, tracking queue 154 contains a copy of each data request received 302 by data caching process 10 after the latest copy of content directory 250 was copied 300 from volatile memory system 150 to non-volatile memory system 152. Accordingly, once server computer/controller 100 is restarted, data caching process 10 may sequentially process each data request included within tracking queue 154 so that the previously-copied version of content directory 250 may be made current.

Unfortunately, simply because a data request is included within tracking queue 154 does not guarantee that the data request was correctly/completely processed. Accordingly and for example, a write request may have been written to tracking queue 154 and, unfortunately, server computer/controller 100 may have crashed prior to first cache system 126 being updated with the content associated with that data request. Accordingly, if the data requests within tracking queue 154 are to be processed to modify content directory 250, data caching process 10 may need to verify that e.g., a piece of content written to data array 130 was indeed written to first cache system 126 prior to updating content directory 250 to indicate that it had been. This may be accomplished by comparing the actual piece of content stored within the data array 130 to the related piece of content stored within e.g., first cache system 126.

Alternatively, data caching process 10 may simply modify content directory 250 stored within non-volatile memory 152 to invalidate the entries within content directory 250 that are related to data requests included within tracking queue 154 (thus assuming that all data requests stored within tracking queue 154 were corrupt and not correctly processed).

Once current, data caching process 10 may copy the now-updated version of content directory 250 from non-volatile memory 152 to volatile memory 150, thus enabling use by data caching process 10. Additionally, in the event that any of the data requests processed by data caching process 10 were data write requests, data caching process 10 may copy the associated content (which was previously stored on data array 130 due to first cache system 126 being a write-through cache) from data array 130 to first cache system 126.

Figure 6A:
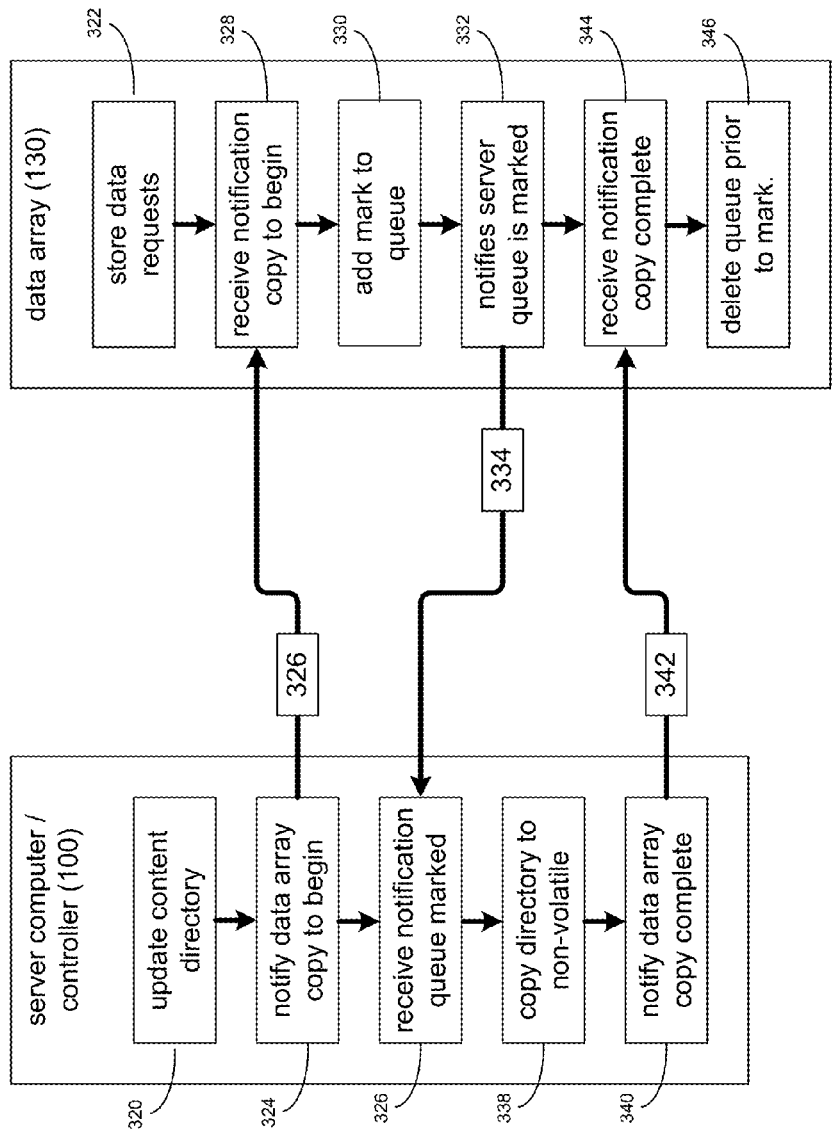
FIG. 6A is a more-detailed version of the flow chart of FIG. 6.

Referring to FIG. 6A, there is shown a more detailed flowchart of data caching process 10 that differentiates between processes executed on server computer/controller 100 versus those executed on data array 130.

Specifically, data caching process 10 may update 320 content directory 250, which is stored within volatile memory 150 on server computer/controller 100. Further, data caching process 10 may store 322 data requests within tracking queue 154 (as described above) located within data array 130. As discussed above, these processes may continue until e.g., tracking queue 154 fills up (e.g., 1,000 data requests) or until a defined period of time has passed (e.g., 1,000 milliseconds). At this point, data caching process 10 may notify 324 data array 130 (via notice 326) that data caching process 10 is about to copy content directory 250 from volatile memory 150 to non-volatile memory 152. Upon data array 130 receiving 328 notice 326 from server computer/controller 100, data caching process 10 may mark 330 tracking queue 154 to indicates the latest data request processed by data caching process 10. Upon data array 130 completing this marking process, data caching process 10 may notify 332 server computer/controller 100 (via notice 334) that the marking process has been completed. Upon server computer/controller 100 receiving 336 notice 334, data caching process 10 may copy 338 content directory 250 from volatile memory 150 to non-volatile memory 152. Upon completing this copying process, data caching process 10 may notify 340 data array 130 (via notice 342) that the copying process is complete. Upon data array 130 receiving notice 342, data array 130 may delete the content of tracking queue 154 prior to the above-described mark.

As discussed above, data array 130 may include second cache system 128. Accordingly, data caching process 10 may execute the above-described cache recovery functionality with respect to second cache system 128.

Cache Content Sharing

Figure 7:
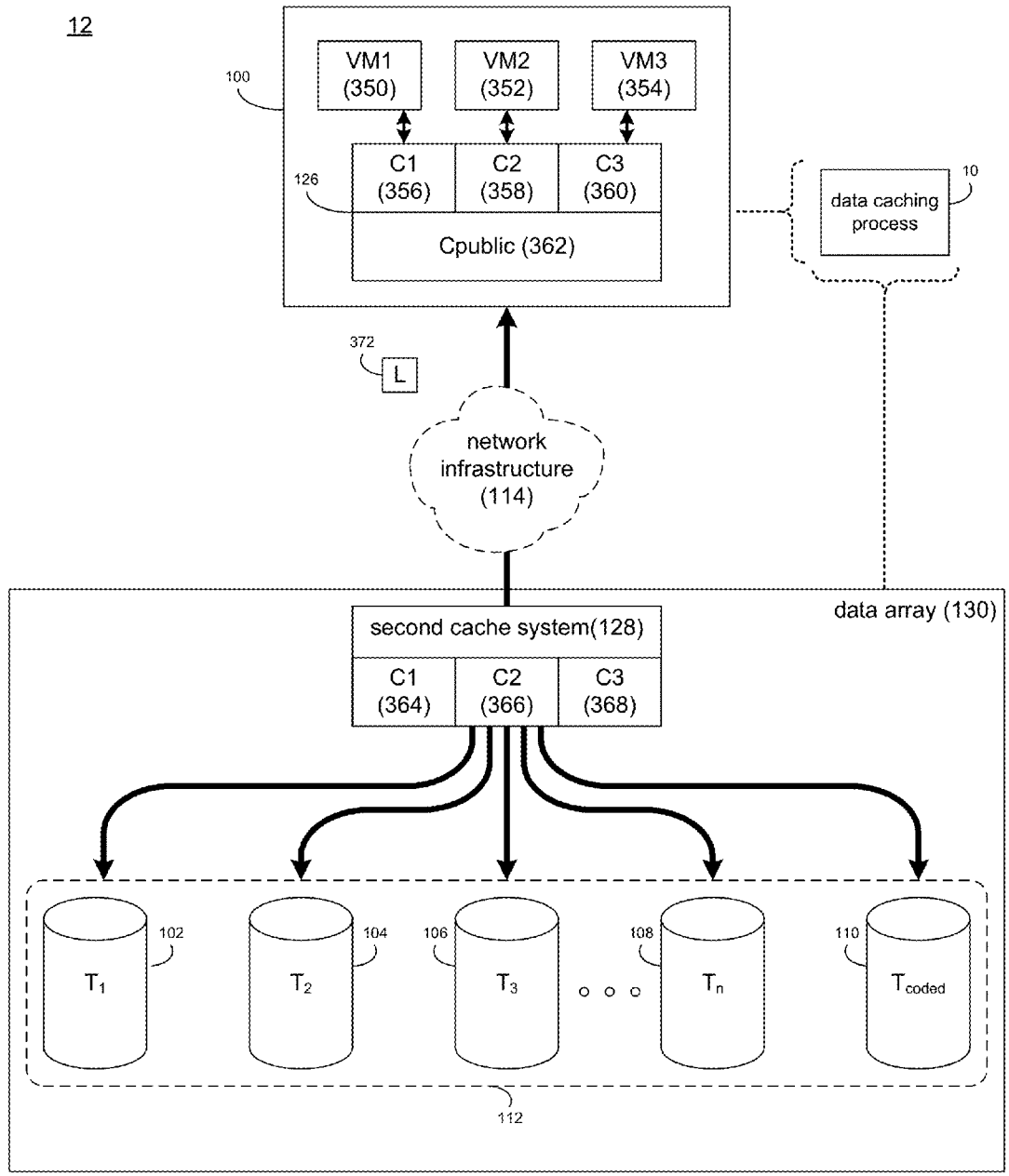
FIG. 7 is a diagrammatic view of an alternative embodiment of the storage system of FIG. 1.
Figure 8:
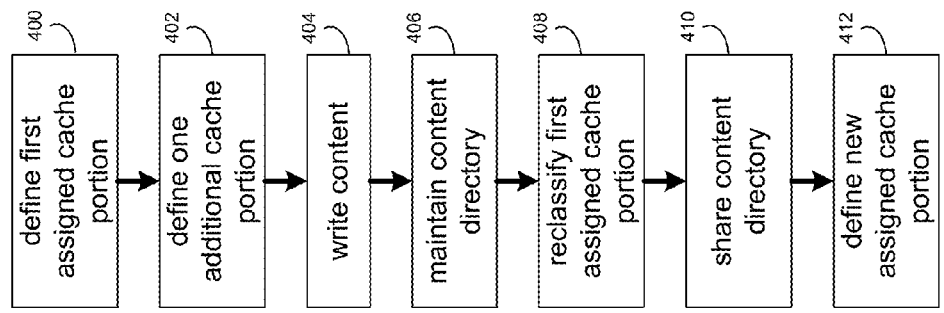
FIG. 8 is a second flow chart of the data caching process of FIG. 1.

Referring also to FIGS. 7-8, assume for illustrative purposes that server computer/controller 100 is configured to execute several virtual machines (e.g., virtual machines 350, 352, 354). As is known in the art, a virtual machine is a software implementation of a physical machine (e.g., a computer) that executes programs like a physical machine. Assume also for this implementation that first cache system 126 is configured as a communal cache system that includes several assigned cache portions (e.g., first assigned cache portion 356, second assigned cache portion 358, third assigned cache portion 360), and an initial public cache portion 362. Each of the assigned cache portions may be assigned to and only accessible by a specific virtual machine. Accordingly, first assigned cache portion 356 may be assigned to first virtual machine 350; second assigned cache portion 358 may be assigned to second virtual machine 352; and third assigned cache portion 360 may be assigned to third virtual machine 354. Further, initial public cache portion 362 may be available for use by all virtual machines (e.g. virtual machines 350, 352, 354). As would be expected, as the number virtual machines increases or decreases, data caching process 10 may increase or decrease the number of assigned cache portions.

Accordingly and during normal operation, data caching process 10 may define 400 a first assigned cache portion (e.g., first assigned cache portion 356) within the cache system (e.g., first cache system 126), wherein first assigned cache portion 356 is associated with first virtual machine 350.

Further, assume that data caching process 10 defines 402 at least one additional assigned cache portion (e.g., second assigned cache portion 358 and third assigned cache portion 360) within the cache system (e.g., first cache system 126), wherein the additional assigned cache portions (e.g., second assigned cache portion 358 and third assigned cache portion 360) are associated with virtual machines 352, 354 (respectively).

Assume that during the course of normal operation, data caching process 10 may write 404 content received by first virtual machine 350 to first assigned cache portion 356. For example and as discussed above, one or more data requests (e.g., write request 116 and/or read request 120) may be sent from client applications 22, 24, 26, 28 or may be internally generated within server computer/controller 100. Either way, the processing of these data requests may result in data caching process 10 writing 404 content (e.g., content 118) to first assigned cache portion 356. Additionally, data caching process 10 may maintain 406 content directory 250 by modifying the same in response to the processing of the above-described data requests.

As discussed above, first cache system 126 and/or second cache system 128 may be content aware cache systems. Therefore, content directory 250 may include content identifier 256. As discussed above, content identifier 256 may be used in a content-aware caching system and may, specifically, be a mathematical representation (e.g., a hash function) of the specific piece of previously-written content that may allow e.g. server computer/controller 100 to quickly determine whether two pieces of previously-written content are identical, as identical pieces of content would have identical content identifiers. Accordingly, through the use of content-aware caching, duplicate data entries within first cache system 126 and/or second cache system 128 may be quickly identified, avoided, and/or eliminated.

Accordingly, as data caching process 10 processes data requests and writes 404 content received by first virtual machine 350 to first assigned cache portion 356, data caching process 10 may modify content directory 250 in the manner described above. Further and assuming that (in this example) first cache system 126 is a content aware cache system, data caching process 10 may generate the above-described content identifiers, which may be included within content directory 250 and may uniquely identify the specific piece of content with which they are associated.

After the occurrence of a reclassifying event (as described below), data caching process 10 may reclassify 408 first assigned cache portion 356 as a public cache portion within (in this example) first cache system 126. For example, first assigned cache portion 356 may be added to initial public cache portion 362. As discussed above, a public cache portion is associated with and accessible by all of the above-described virtual machines (e.g., virtual machines 350, 352, 354). Accordingly, when data caching process 10 reclassifies 408 first assigned cache portion 356 as a public cache portion (i.e., equivalent to public cache portion 262), what was only available to virtual machine 350 is now also available (in this example) to virtual machines 352, 354.

Concerning the above-referenced reclassifying event, examples of such may include but are not limited to: the expiry of a reclassifying timer; the receipt of a defined quantity of content, and the filling of a tracking queue. For example, data caching process 10 may be configured to so that every e.g., 1,000 milliseconds, data caching process 10 reclassifies 408 first assigned cache portion 356 as a public cache portion. Alternatively, data caching process 10 may be configured to so that every time e.g., 1,000 write operations are performed on first assigned cache portion 356, data caching process 10 reclassifies 408 first assigned cache portion 356 as a public cache portion. Further, data caching process 10 may be configured so that write operations are tracked within a tracking queue (e.g., tracking queue 154) and every time that this tracking queue is filled, data caching process 10 reclassifies 408 first assigned cache portion 356 as a public cache portion When data caching process 10 reclassifies 408 first assigned cache portion 356 as a public cache portion, data caching process 10 may share 410 content directory 250 (which includes content identifiers 256) with the other virtual machines (e.g., virtual machines 352, 354). Accordingly, the content stored within first assigned cache portion 356 that was reclassified 408 as a public cache portion is now available to all virtual machines.

Accordingly and for example, when a data read request is received and processed by e.g., virtual machine 354 that concerns data stored at a specific LUN/LBA within data array 130, data caching process 10 may review the content directory that was shared 410 by data caching process 10 and is associated with this newly-public cache portion to see if the appropriate LUN/LBA is defined within the content directory. If so, data caching process 10 may obtain the appropriate piece of content from the newly-public cache portion reclassified 408 by data caching process 10 (as opposed to obtaining the same from data array 130).

Further, when a data write request that includes data to be written to a specific LUN/LBA within data array 130 is received and processed by e.g., virtual machine 354, data caching process 10 may generate a content identifier for the data included within the write request. Data caching process 10 may then compare this newly-created content identifier to the content identifiers included within the content directory that was shared 410 by data caching process 10 and is associated with this newly-public cache portion to see if a matching content identifier is defined within the content directory. If so, the data associated with the data write request already exists within the newly-public cache portion. Accordingly, data caching process 10 may simply modify the related entry within the content directory so that this entry is also related to the specific LUN/LBA defined within the data write request (as opposed to writing a second copy of the content to (in this example) first cache system 126.

Additionally and after the occurrence of the above-described reclassifying event, data caching process 10 may define 412 a new assigned cache portion within (in this example) first cache system 126, wherein this new assigned cache portion is associated with first virtual machine 350. Specifically, data caching process 10 may define 412 this new assigned cache portion to replace first assigned cache portion 356, which was reclassified 408 by data caching process 10 as a public cache portion. When defining 412 a new assigned cache portion for virtual machine 350, data caching process 10 may reclassify a portion of public cache portion 262 to define 412 the new assigned cache portion for virtual machine 350.

While the system is described above as being utilized with virtual machines, this is for illustrative purposes only and is not intended to be a limitation disclosure, as other configurations are possible and are considered to be within the scope of this disclosure. For example, the above-described system may be configured to work with physical machines, wherein a plurality of physical machines share a communal cache system. This communal cache system may include a plurality of individual assigned cache portions that are each assigned to individual physical machines, and a public cache portion is shared amongst the physical machines.

As discussed above, data array 130 may include second cache system 128. Accordingly, data caching process 10 may execute the above-described cache content sharing functionality with respect to second cache system 128.

Cache Warming

When a cache portion is transitioned from an assigned cache portion to a public cache portion (i.e., after the occurrence of the above-described reclassifying event), data caching process 10 may utilize this newly-available information to warm the cache of another virtual machine.

Assume for this example that second cache system 128 (in addition to first cache system 126) is a content aware cache system. Accordingly, a content directory may be maintained for second cache system 128 and a content identifier may be generated for each piece of content included within second cache system 128. Further, assume for this example that data array 130 is segmented based upon virtual machine. For example, storage target 102 (of data array 130) may only be accessible by virtual machine 350; storage target 104 (of data array 130) may only be accessible by virtual machine 352; and storage target 106 (of data array 130) may only be accessible by virtual machine 354. Additionally, second cache system 128 may also be segmented based upon virtual machine. For example, first cache portion 364 may be assigned to virtual machine 350; second cache portion 366 may be assigned to virtual machine 352; and third cache portion 368 may be assigned to virtual machine 354.

Figure 9:
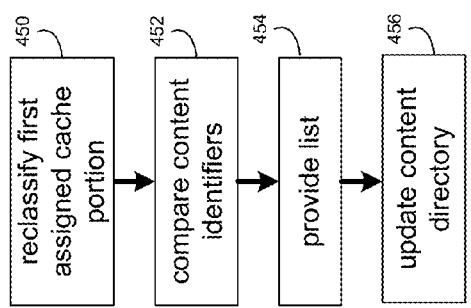
FIG. 9 is a third flow chart of the data caching process of FIG. 1.

Referring also to FIG. 9, assume that the above-described reclassifying event occurs and data caching process 10 reclassifies 450 first assigned cache portion 356 associated with (in this example) first virtual machine 350 as a public cache portion that is associated with and accessible by all virtual machines (e.g., virtual machines 350, 352, 354). As discussed above, this newly-public cache portion includes a plurality of pieces of content that were received by first virtual machine 350. Further and as discussed above, when data caching process 10 reclassifies 450 first assigned cache portion 356 as a public cache portion, data caching process 10 may share content directory 250 (which includes content identifiers 256) with the other virtual machines (e.g., virtual machines 352, 354). Additionally, data caching process 10 may share content directory 250 (and the content identifiers 256 included therein) with second cache system 128 (included within data array 130). As discussed above, second cache system 128 is also a content aware cache system. Therefore, a content identifier has been generated for each piece of content included within second cache system 128.

Data caching process 10 may compare 452 the content identifier associated with each piece of content included within the newly-public cache portion (i.e., the cache portion that was reclassified 450 by data caching process 10) with content identifiers for pieces of content included within the portions of data array 130 that are associated with other virtual machines to generate a list of matching data portions. For this example and as discussed above, storage target 102 (of data array 130) is associated with virtual machine 350; storage target 104 (of data array 130) is associated with virtual machine 352; and storage target 106 (of data array 130) is associated with virtual machine 354. Accordingly, data caching process 10 may compare the content identifiers included within the content directory of the newly-public cache portion (which was previous assigned to virtual machine 350 before being reclassified 450 by data caching process 10) to the content identifiers included within the content directories associated with e.g., second cache portion 366 of second cache system 128 associated with storage target 104 of data array 130 (which is associated with virtual machine 352) and third cache portion 368 of second cache system 128 associated with storage target 106 of data array 130 (which is associated with virtual machine 354).

Once data caching process 10 has compared 452 the above-described content identifiers to determine whether matching content identifiers exist (and, therefore, matching content exists within data array 130), data caching process 10 may generate list 372 that defines such matching content. Examples of the information included within list 372 may include but are not limited to: a content identifier for the matching content, the location of the matching content within data array 130, and the location of the matching content within the newly-public cache portion within first cache system 126.

Data caching process 10 may provide 454 list 372 to the assigned cache portion(s) (e.g., second cache portion 358 and/or third cache portion 360) within first cache system 126 that are associated with e.g., virtual machines 352, 354 (respectively). Data caching process 10 may then process list 372 to update 456 the content directory associated with each of the assigned cache portions (e.g., second cache portion 358 and/or third cache portion 360) within first cache system 126 based, at least in part, upon list 372.

Assume for this example that data caching process 10 reclassifies 450 first assigned cache portion 356 associated with (in this example) first virtual machine 350 as a public cache portion that is associated with and accessible by all virtual machines (e.g., virtual machines 350, 352, 354).

As discussed above, data caching process 10 may compare 452 the content identifier associated with each piece of content included within the newly-public cache portion (i.e., the cache portion that was reclassified 450 by data caching process 10) with content identifiers for pieces of content included within the portions of data array 130 that are associated with other virtual machines to identify matches and generate a list of matching data portions.

Further, assume that a piece of content included within this newly-public cache portion (as defined by entry 258 within content directory 250): is stored within data array 130 at LUN0/LBA5; is stored within this newly-public cache portion of first cache system 126 at address 111110, and has a content identifier 256 of ablccba. Further, assume that once data caching process 10 compares 452 the content identifier (i.e., ablccba) included within entry 258 to the content identifiers for the content included within the portions of data array 130 that are associated virtual machine 352 and virtual machine 354 (namely storage target 104 of data array 130 and storage target 106 of data array 130; respectively), a piece of content located at LUN1/LBA9 (within storage target 104) and a piece of content located at LUN2/LBA6 (within storage target 106) have an identical content identifier (namely ablccba). Accordingly, the content at LUN0/LBA5, LUN1/LBA9, and LUN2/LBA6 is identical. And as discussed above, this content is locally cached within first cache system 126 at address 111110.

Accordingly, data caching process 10 may update 456 the content directory utilized by first cache system 126 for virtual machine 352 to add an entry for LUN1/LBA9 that points to address 111110 within first cache system 126 and identifies a content identifier (namely ablccba) for this entry. Therefore, in the event that virtual machine 352 receives a read request for data located at LUN1/LBA9 within data array 130, data caching process 10 may obtain the locally-cached copy of the content from address 111110 of first cache system 126 (as opposed to having to obtain it from data array 130).

Further, data caching process 10 may update 456 the content directory utilized by first cache system 126 for virtual machine 354 to add an entry for LUN2/LBA6 that points to address 111110 within first cache system 126 and identifies a content identifier (namely ablccba) for this entry. Therefore, in the event that virtual machine 354 receives a read request for data located at LUN2/LBA6 within data array 130, data caching process 10 may obtain the locally-cached copy of the content from address 111110 of first cache system 126 (as opposed to having to obtain it from data array 130).

While the system is described above as being utilized with virtual machines, this is for illustrative purposes only and is not intended to be a limitation disclosure, as other configurations are possible and are considered to be within the scope of this disclosure. For example, the above-described system may be configured to work with physical machines, wherein a plurality of physical machines share a communal cache system. This communal cache system may include a plurality of individual assigned cache portions that are each assigned to individual physical machines, and a public cache portion is shared amongst the physical machines.

Cache System Copy

Figure 10:
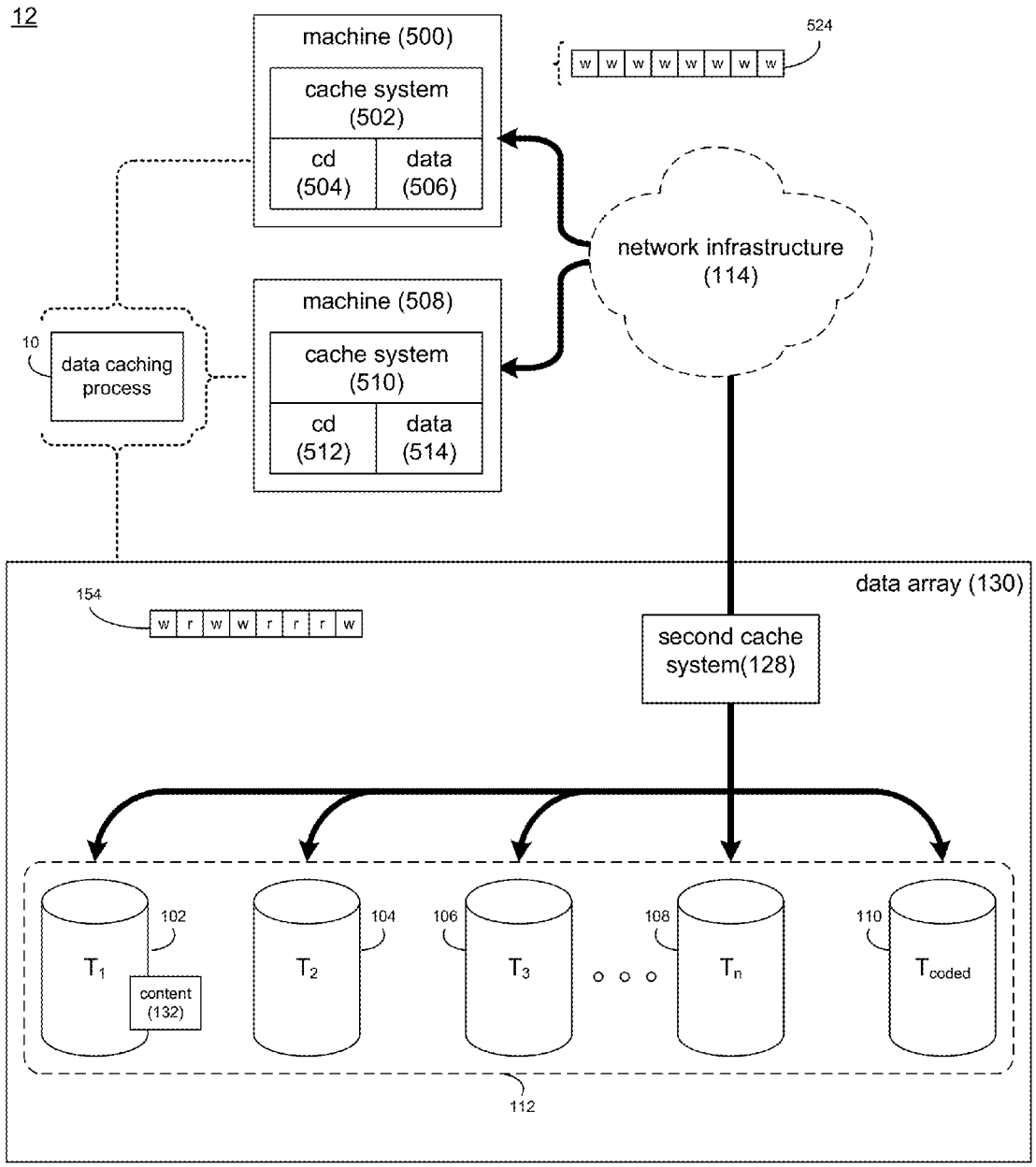
FIG. 10 is a diagrammatic view of an alternative embodiment of the storage system of FIG. 1.
Figure 11:
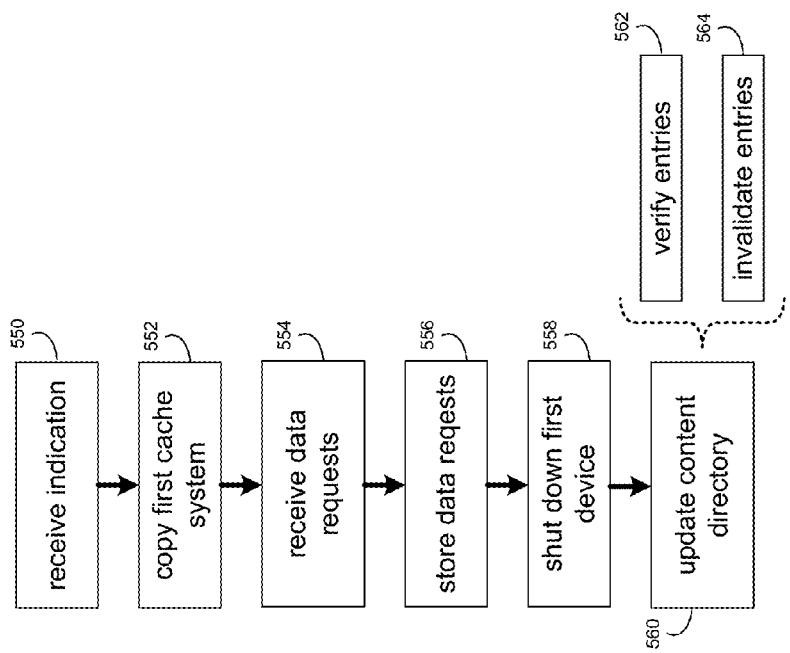
FIG. 11 is a fourth flow chart of the data caching process of FIG. 1.

Referring also to FIGS. 10-11, assume for illustrative purposes that first server computer/controller 500 includes first cache system 502. First cache system 502 may include first content directory 504 and first cache content 506. As discussed above, first content directory 504 may be configured to associate first cache content 506 stored within first cache system 502 with content (e.g., content 132) stored within data array 130.

Assume that for some reason, data caching process 10 receives 550 an indication, on first server computer/controller 500, that first server computer/controller 500 is to be shut down or that a resource running on first server computer/controller 500 is about to be moved. For example, first server computer/controller 500 may be e.g., shutting down for a service upgrade or resources associated with first server computer/controller 500 (such as a LUN) may be moving/reassigned for load balancing purposes.

For example, assume that first server computer/controller 500 and other machines/devices are in a cluster, which allows only one machine/device to access each resource (e.g. LUN) at a time. Accordingly, data caching process 10 may effectuate the below-described functionality prior to transferring a resource from one machine/device to another machine/device within the cluster.

Upon receiving 550 such an indication, data caching process 10 may copy 552 first cache system 502 from first server computer/controller 500 to second server computer/controller 508.

Second server computer/controller 508 may include second cache system 510, which may be configured as a duplicate of first cache system 502. Specifically, as first cache system 502 is being copied 552 from first server computer/controller 500 to second server computer/controller 508, data caching process 10 may configure second cache system 510 so that is a duplicate copy of first cache system 502 (at the point that the above-described copying procedure began, completed, or somewhere in between). Accordingly, second cache system 510 may include duplicate content directory 512 (which is a duplicate of first content directory 504) and duplicate cache content 514 (which is a duplicate of first cache content 506).

As discussed above, first server computer/controller 500 and second server computer/controller 508 may be configured in a cluster, which may require the transferring of resources (e.g., a LUN) from one machine to another machine within the cluster before a device may control a resource. In order to effectuate such a transfer of resources, data caching process 10 may partition cache system 502 and/or cache system 508 so that each cache partition services only a single resource, thus allowing for simplified cache management/reassignment/transfer.

During the above-described copying 552 procedure, data caching process 10 may receive 554, on first server computer/controller 500, one or more data requests (e.g. data write requests 116 (which may include content 118) and data read request 120) that are intended to be executed on first cache system 502. Specifically, these data requests may concern a plurality of data actions to be taken on data array 130 that is associated with first server computer/controller 500. As discussed above, data write request 116 may include a piece of content (content 118) to be written a specific LUN/LBA within data array 130. Further, data read request may concern a specific piece of content to be retrieved from a LUN/LBA within data array 130.

As these requests are received 554 and until the above-described copying 552 procedure is completed, data caching process 10 may store 556 the plurality of data requests on tracking queue 154 included within data array 130 associated with first server computer/controller 500 and may or may not suspend adding content to first cache content 506. Data caching process 10 may continue the above-described storage 556 procedure until the above-describe copy 552 procedure is completed. Additionally, while the above-described requests may bypass first cache system 502 and are stored 556 within tracking queue 154, these requests are still satisfied.

For example, while the above-described copy 552 procedure is occurring, data caching process 10 may be configured so that content is not added to first cache content 506. Specifically, when read requests arrive, data caching process 10 may satisfy the read request by providing a copy of content included within first cache content 506 (assuming that a cache hit occurs). In the event of a cache miss, data caching process 10 may obtain the requested content from data array 130 (but not write it to first cache content 506). When a write request is processed by data caching process 10, data caching process 10 may write the related content to data array 130 and invalidate the related cache entry within first content directory 504 (as the content was not written to first cache content 506). Accordingly and in such a configuration, tracking queue 154 may only need to keep track of write requests so that the cache entries associated with those write requests can be invalidated.

Once the above-described copy 552 procedure is completed, data caching process 10 may shut down 558 first server computer/controller 500 or may move the requested resource to/from the first server. Additionally and upon completion of the above-described copy 552 procedure, data caching process 10 may update 560 duplicate content directory 512 on second server computer/controller 508 based, at least in part, upon the one or more data requests (e.g. data write requests 116, which may include content 118) stored 556 on tracking queue 154.

Specifically, the above-described duplicate content directory 512 (which is a duplicate of first content directory 504) and the above-described duplicate cache content 514 (which is a duplicate of first cache content 506) are a snapshot of what first cache system 502 looked like at the point in time when the cache stopped being updated before copying 552 procedure. Further, the data requests currently stored within tracking queue 154 represent the changes that would have been made to first cache system 502 during the copying procedure. Accordingly, by processing the requests stored within tracking queue 154 (with respect to second cache system 510), second cache system 510 may be appropriately modified by the data requests included within tracking queue 154. For example, if the data request stored within tracking queue 154 was a data write request, the data may be invalidated from cache system 510.

In another example, during the above-described copy 552, data caching process 10 may be configured so that content is added to first cache content 506. Specifically, when read requests arrive, data caching process 10 may satisfy the read request by providing a copy of content included within first cache content 506 (assuming that a cache hit occurs). In the event of a cache miss, data caching process 10 may obtain the requested content from data array 130 and write it to first cache content 506. When a write request is processed by data caching process 10, data caching process 10 may write the related content to data array 130 and write the content to first cache content 506. Accordingly and in such a configuration, tracking queue 154 may keep track of both write requests and read request.

Once the above-described copy 552 procedure is completed, data caching process 10 may shut down 558 first server computer/controller 500 or may move the requested resource to/from the first server computer/controller 500. Additionally and upon completion of the above-described copy 552 procedure, data caching process 10 may update 560 duplicate content directory 512 on second server computer/controller 508 based, at least in part, upon the one or more data requests (e.g. data write requests 116 (which may include content 118) and data read requests 120) stored 556 on tracking queue 154.

Specifically, the above-described duplicate content directory 512 (which is a duplicate of first content directory 504) is a snapshot of the content directory at some point in time during copying 552 procedure and each entry at the above-described duplicate cache content 514 (which is a duplicate of first cache content 506) are a snapshot of the same entry of first cache system 502 at the point in time during copying process 552. Further, the data requests currently stored within tracking queue 154 represent the changes that would have been made to first cache system 502 during the copying procedure. Accordingly, by processing the requests stored within tracking queue 154 (with respect to second cache system 510), second cache system 510 may be appropriately modified by the data requests included within tracking queue 154. For example, if the request stored within tracking queue 154 was a data write request, the data that was already written to (and is available from) data array 130 may be copied to second cache system 510.

Unfortunately, simply because a data request is included within tracking queue 154 does not guarantee that the data request was correctly/completely processed. For example, if data caching process 10 is configured so that content is added to first cache content 506 while the above-described copying 552 procedure is occurring, the accuracy of second cache content 514 may be questionable. Therefore, if the data requests within tracking queue 154 are to be processed to update 560 duplicate content directory 512, data caching process 10 may need to verify 562 one or more data requests included within tracking queue 154 to ensure that e.g., a piece of content written to data array 130 was indeed written to second cache system 510 (which is a duplicate of first cache system 502) prior to updating duplicate content directory 512 to indicate that it had been. This may be accomplished by comparing the actual piece of content stored within data array 130 to the related piece of content stored within e.g., second cache system 510.

Alternatively, if data caching process 10 was configured so that content was not added to first cache content 506 while the above-described copying 552 procedure is occurring, when updating 560 duplicate content directory 512, data caching process 10 may simply modify duplicate content directory 512 to invalidate 564 the entries within duplicate content directory 512 that are related to write requests included within tracking queue 154.

Consolidated Write Operation

Figure 12:
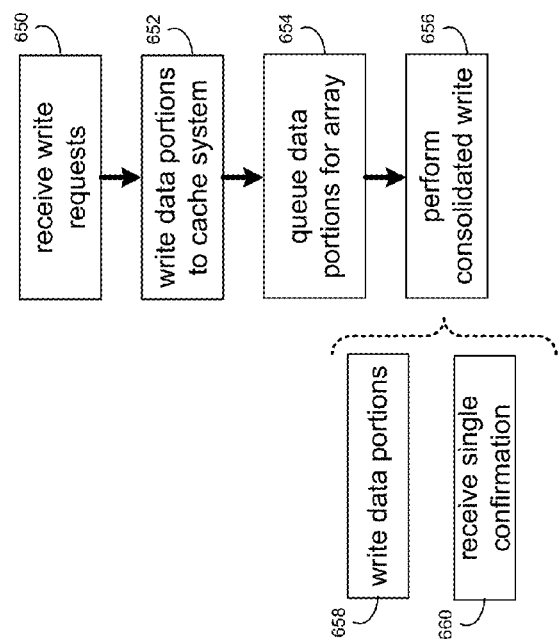
FIG. 12 is a fifth flow chart of the data caching process of FIG. 1.

Data caching process 10 may be configured to effectuate one or more consolidated write operation is to increase the efficiency of the above-described cache systems. For example and referring also to FIG. 12, data caching process 10 may receive 650, on e.g., cache system 502, a plurality of data write requests (e.g., multiple versions of write request 116, wherein each data write request identifies a data portion (e.g., content 118) to be written to data array 130 associated with cache system 502.

Typically and with respect to any write-through cache, when data write request are received, they are immediately processed, in that content 118 is immediately written to data array 130 and immediately written to cache system 502, a write confirmation is received from data array 130 by cache system 502, and a write confirmation is provided to the requester.

Alternatively and with respect to write-back caches, content 118 is immediately written to the cache system 502 and a confirmation is provided to the requester. However, a plurality of write requests may be queued (in e.g., write request queue) for subsequent processing with respect to data array 130. Specifically, after a defined period of time, the write request queued within write request queue 524 may be processed and the respective pieces of content associated with each write request may be written to data array 130. Further, a write confirmation may be provided by data array 130 for each of the pieces of content written to data array 130. Accordingly, in the event that one hundred write requests were processed (resulting in one hundred pieces of data being written to data array 130), one hundred write confirmations may be received from data array 130.

However and in this particular environment, data caching process 10 may be configured to more efficiently write content to data array 130. Continuing with the above-stated example, data caching process 10 may write 652 the data portions associated with the data write requests received by cache system 502. Accordingly, as data write requests are received by cache system 502, these write requests are processed and any associated data portions are written 652 to cache system 502. However, data caching process 10 may queue 654 (with respect to data array 130) the data portions (e.g. content 118) associated with the data write requests (e.g. write request 116) until the occurrence of a commit event. Examples of such a commit event may include but are not limited to the expiry of a commit timer (1,000 milliseconds) and the receipt of a defined quantity of data portions (1,000 pieces of content). For example, data caching process 10 may be configured such that content is written to data array 130 every 1,000 milliseconds or whenever 1,000 pieces of content are present within e.g., write request queue 524.

Upon the occurrence of such a commit event, data caching process 10 may perform 656 a write operation to write the data portions (e.g. content 118) associated with the data write requests (e.g. write request 116) to data array 130.

Specifically, when performing 656 such a write operation, data caching process 10 may periodically write 658 the data portions (e.g. content 118) associated with the data write requests (e.g. write request 116) to data array 130 and may receive 660 a single write confirmation from data array 130 in response to writing 658 the data portions (e.g. content 118) associated with the data write requests (e.g. write request 116) to data array 130.

For example, data caching process 10 may periodically write 658 content to the backend storage (e.g., data array 130) so that performance improvements may be achieved. For example, write folding may result in increased performance. Specifically, if several of the write requests included within write request queue 524 concern the same LUN/LBA within storage array 130, data caching process 10 may only process the last write request for that LUN/LBA (as successive writes to the same LUN/LBA overwrite each other). Further, as data caching process 10 provides a large quantity of write requests (e.g., 16, 32, 64, 128, 256, 512, 1024 write requests) to data array 130 in an asynchronous parallel fashion (and the data array only sends a single write confirmation to server computer/controller 100), performance is increased, as server computer/controller 100 does not need to wait until a write confirmation is received for a first write request prior to sending a second write request.

Accordingly, in the event that 1.000 pieces of content are written 658 by data caching process 10 to data array 130, data caching process 10 may only receive 660 a single write confirmation (confirming the writing on 1,000 pieces of content) from data caching process 10 (as opposed to 1,000 write confirmations, each confirming the writing on one piece of content).

Figure 12A:
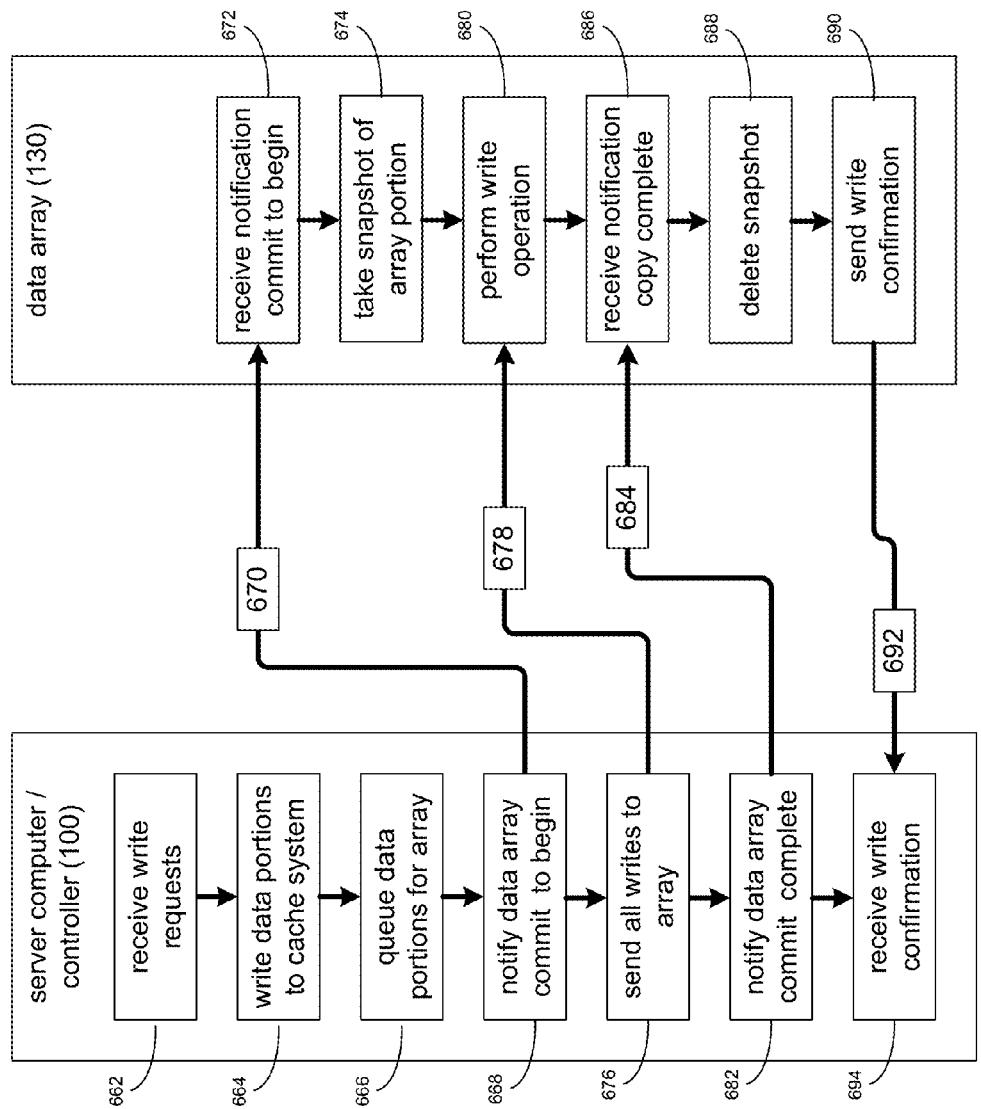
FIG. 12A is a more-detailed version of the flow chart of FIG. 13.

Referring to FIG. 12A, there is shown a more detailed flowchart of data caching process 10 that differentiates between processes executed on server computer/controller 100 versus those executed on data array 130.

Specifically, data caching process 10 may receive 662 write requests, which may be processed so the related content may be written 664 to e.g., cache system 502. Additionally, data caching process 10 may queue 666 these write requests (for subsequent batch processing by data array 130) until the occurrence of a commit event. Examples of such a commit event may include but are not limited to the expiry of a commit timer (1,000 milliseconds) and the receipt of a defined quantity of data portions (1,000 pieces of content). Once such a commit event occurs, data caching process 10 may notify 668 (via notice 670) of the upcoming commit event. Upon notice 670 being received 672 by data array 130, data caching process 10 may take 674 a "snapshot" of the portion of data array 132 for which the above-described write requests concern. For example, data caching process 10 may make a copy of a particular LUN within storage array 130.

Data caching process 10 may send 676 all of the content (e.g. content 678) concerning the above-described write requests to data array 130. Upon receiving content 678, data caching process 10 may perform 680 the above-described write operation. Once all of the content associated with the above-described write requests is sent 676 to data array 130, data caching process 10 may notify 682 (via notice 684) data array 130 that the commit event is complete.

Upon such notification being received 686 by data array 130, data caching process 10 that may delete 688 the above-described "snapshot" and may send 690 a write confirmation (e.g. confirmations 692) concerning the content written to data array 130, which is received 694 by server computer/controller 100.

In the event of e.g., a crash of server computer/controller 100 prior to the completion of the above-described commit event, the data stored within data array 130 may be corrupt due to the asynchronous manner in which the content is written to data array 130. Accordingly, data caching process 10 may use the "snapshot" to restore data array 130 to the condition that it was in prior to the commit event being initiated by data array 130.

Virtual Machine Copy

Figure 13A:
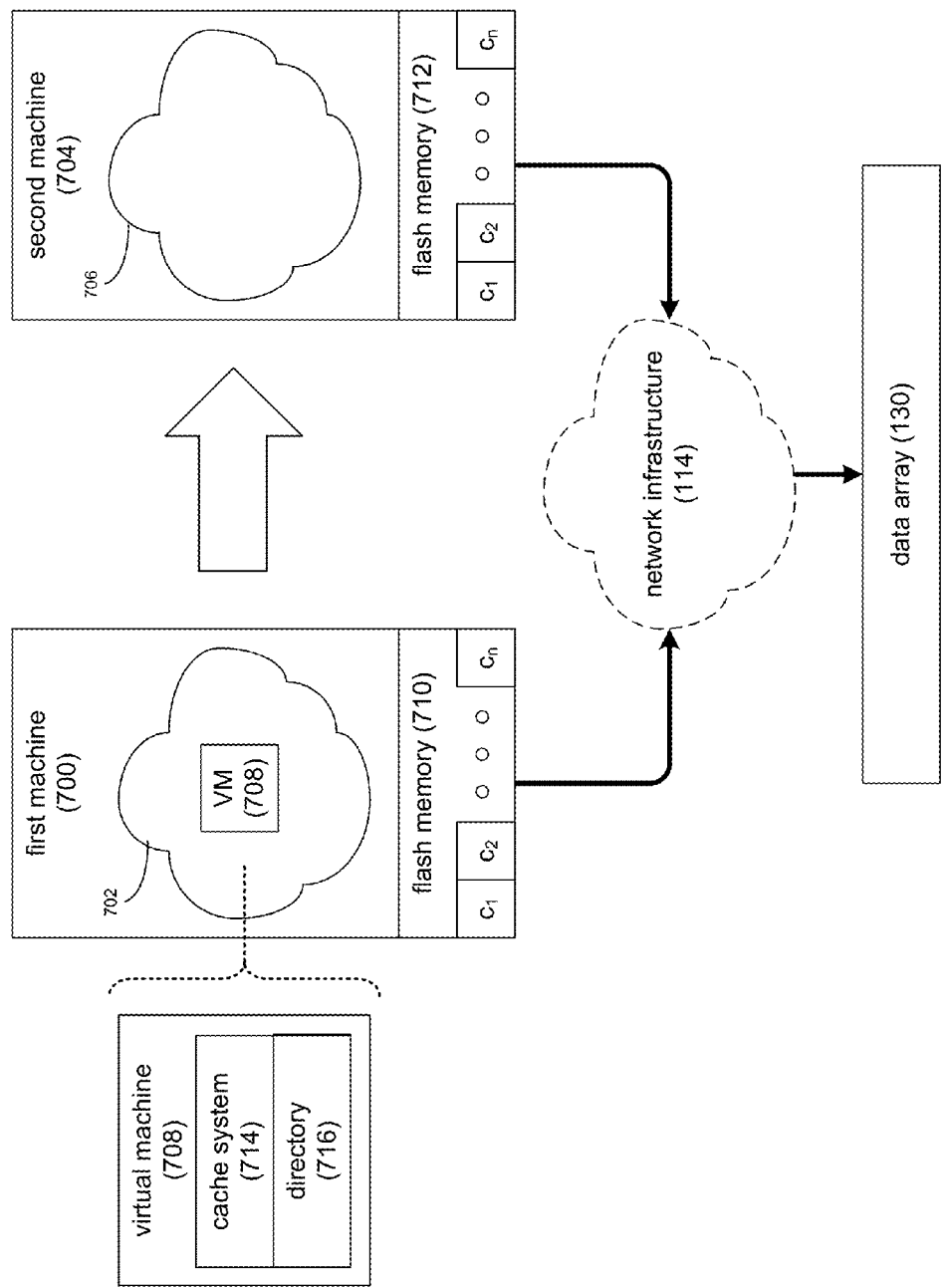
FIG. 13A is a diagrammatic view of an alternative embodiment of the storage system of FIG. 1.
Figure 13B:
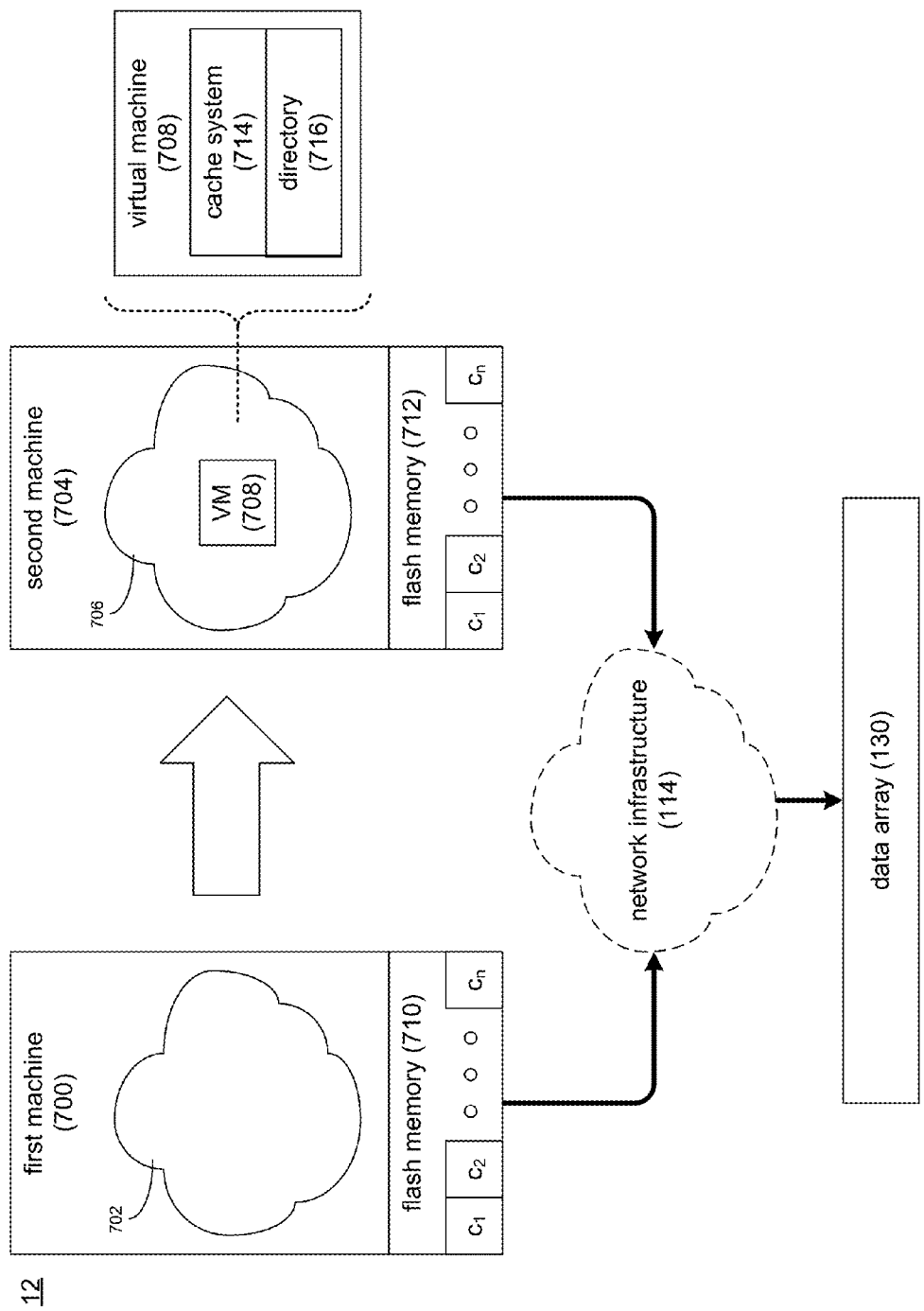
FIG. 13B is a diagrammatic view of an alternative embodiment of the storage system of FIG. 1.

Referring also to FIGS. 13A-13B, assume for the following example that first server computer/controller 700 is a physical device that is executing first virtual machine operating environment 702. An example of such a virtual machine operating environment is a hypervisor, which is an instantiation of an operating system that allows for multiple virtual machines to operate within a single physical device (e.g., first server computer/controller 700). Further, second server computer/controller 704 is a physical device that is executing second virtual machine operating environment 706 (e.g., a hypervisor).

For this example, further assume that hypervisor 702 within first server computer/controller 700 is executing a virtual machine (e.g., virtual machine 708). While hypervisor 702 is shown to be executing only a single virtual machine, this is for illustrative purposes only and is not intended to be a limitation of this disclosure, as the number of virtual machines executed within hypervisor 702 may increase/decrease depending upon need/loading.

Assume further that first server computer/controller 700 and second server computer/controller 704 each includes a non-volatile storage system (e.g., flash memory devices 710, 712, respectively) that first server computer/controller 700 and second server computer/controller 704 may use for cache storage, Each of flash memory devices 710, 712 may be compartmentalized (e.g., into "n" portions, wherein a unique portion of flash memory device 710 is assigned to each virtual machine running on hypervisor 702 and a unique portion of flash memory device 712 is assigned to each virtual machine running on hypervisor 706.

Virtual machine 708 may include cache system 714, which may include content directory 716. Content directory 716 may be configured to identify the location of specific pieces of content included within (in this example) flash memory device 710) and their corresponding pieces of data within data array 130.

Referring also to FIG. 14, assume that for some reason (e.g., maintenance/load balancing), data caching process 10 receives 750 an indication, on virtual machine 708, that virtual machine 708 is going to be migrated. Specifically, through the use of products like VMware, virtual machines may be migrated (from a first physical device to a second physical device) without being shut down, (which is commonly referred to as a live migration or vmotion). Importantly, virtual machines typically cannot be migrated when the virtual machine is using/coupled to a physical storage device. Accordingly and in such a situation, the physical storage device will first need to be detached from the virtual machine before the virtual machine can be migrated.

Assume for illustrative purposes that the above-described indication concerns virtual machine 708 being migrated from hypervisor 702 running on first server computer/controller 700 to hypervisor 706 running on second server computer/controller 704. Specifically, FIG. 13A is intended to illustrate the system prior to the migration of virtual machine 708 to hypervisor 706 and FIG. 13B is intended to illustrate the system subsequent to the migration of virtual machine 708 to hypervisor 706. One or more of the above-described hypervisors (e.g., hypervisor 702 and/or hypervisor 706) may use one or more plug-ins/applets within the management framework of the hypervisor to allow for processing of the above-described indication notification and to effectuate the above-described migration.

Upon receiving 750 the above-described indication, data caching process 10 may downgraded 752 the mode of operation of cache system 714 within virtual machine 708. The manner in which the mode of operation of cache system 714 is downgraded 752 by data caching process 10 may vary depending on the manner in which data caching process 10 is implemented. For example and for illustrative purposes, assume that data caching process 10 downgrades 752 the mode of operation of cache system 714 in a two-step process. For example, upon receiving the above-described indication, data caching process 10 may initially downgrade 754 the operation of cache system 714 so that, once initially downgraded 754, cache system 714 may operate as follows: a) for read requests that result in cache hits, cache system 714 will obtain the requested content from the appropriate portion of flash memory device 710 that is associated with cache system 714; for read requests that result in cache misses, cache system 714 may obtain the requested content from data array 130 (but the obtained content will not be copied into flash memory device 710); and c) for write requests, the provided content may be written to data array 130 (but the provided content will not be copied into flash memory device 710) and the corresponding cache entry in content directory 716 will be invalidated.

Data caching process 10 may place flash memory device 710 into the above-described downgrade mode so that data caching process 10 may copy 756 content included within the appropriate portion of flash memory device 710 to the appropriate portion of flash memory device 712 without having new data written to flash memory device 710. Accordingly, by placing flash memory device 710 into the above-described downgrade mode, data caching process 10 is ensuring that the appropriate content within flash memory device 710 will be accurately copied to the appropriate portion of flash memory device 712. For example, assume that cache portion $c_1$ of flash memory device 710 was assigned to virtual machine 708 and (once migrated) cache portion $c_1$ of flash memory device 712 will be assigned to virtual machine 708. Accordingly, by placing flash memory device 710 into the above-described downgrade mode, the accuracy of the above-described copy procedure 756 is insured by data caching process 10, as no additional data will be written to cache portion $c_1$ of flash memory device 710 once copy procedure 756 is initiated.

Once copy procedure 756 is completed, data caching process 10 may place 758 flash memory device 710 into a subsequent downgrade mode, thus placing cache system 714 into a higher level of downgrade. When placed into this higher level of downgrade, cache system 714 may operate as follows: a) for read requests that result in cache hits, cache system 714 will obtain the requested content from data array 130; for read requests that result in cache misses, cache system 714 may obtain the requested content from data array 130 (and the obtained content will not be copied into flash memory device 710); and c) for write requests, the provided content may be written to data array 130 (but the provided content will not be copied into flash memory device 710) and the corresponding cache entry in content directory 716 will be invalidated.

Upon entering 758 subsequent downgrade mode, data caching process 10 may detach 760 flash memory device 710 from virtual machine 708 and may migrate 762 virtual machine 708 from hypervisor 702 to hypervisor 706. As discussed above, through the use of products like VMware, virtual machine 708 may be migrated 762 from hypervisor 702 to hypervisor 706 without being shut down, which is commonly referred to as a live migration or vmotion.

Once data caching process 10 migrates 762 virtual machine 708 from hypervisor 702 to hypervisor 706 (resulting in the system being configured in the manner shown in FIG. 13B), data caching process 10 may attach 764 flash memory 712 to the newly-migrated virtual machine 708 and resume 766 normal operation of virtual machine 708.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
copying a content directory associated with a cache system from a volatile memory system to a non-volatile memory system;
receiving, on the cache system, a plurality of data requests concerning a plurality of data actions to be taken on an electro-mechanical storage device associated with the cache system;
updating the content directory on the volatile memory system based, at least in part, upon the plurality of data requests to reflect changes made to content of the cache system;
processing the plurality of data requests on the electro-mechanical storage device;
storing the plurality of data requests on a tracking queue included within the electro-mechanical storage device until the tracking queue is full or a defined period of time lapses;
upon detecting a failure event, updating the content directory on the volatile memory system with each data request included on the tracking queue; and
comparing content stored within the electro-mechanical storage device to related content stored within the cache system to verify that the related content stored within the cache system was processed on the cache system, wherein the non-volatile memory system is a flash memory device and the volatile memory system is a random access memory device.

2. The computer-implemented method of claim 1 further comprising:
upon detecting the failure event, updating the content directory on the non-volatile memory system based, at least in part, upon the plurality of data requests stored upon the electro-mechanical storage device.

3. The computer-implemented method of claim 1 further comprising:
when the tracking queue is filled or the defined period of time lapses, providing a notice to the electro-mechanical storage device that the content directory is about to be copied from the volatile memory to the non-volatile memory;
upon notification, marking the tracking queue with a mark to indicate a most recent data request processed on the cache system; and
flushing the tracking queue included within the electro-mechanical storage device including deleting content of the tracking queue prior to the mark.

4. The computer-implemented method of claim 1 wherein the cache system is a flash memory cache system.

5. The computer-implemented method of claim 1 wherein the electro-mechanical storage device is included within a storage array.

6. The computer-implemented method of claim 1 wherein the content directory is configured to associate data stored within the cache system with data stored within the electro-mechanical storage device.

7. A computer program product residing on a non-transitory computer readable medium having a plurality of instructions stored thereon which, when executed by a processor, cause the processor to perform operations comprising:
copying a content directory associated with a cache system from a volatile memory system to a non-volatile memory system;
receiving, on the cache system, a plurality of data requests concerning a plurality of data actions to be taken on an electro-mechanical storage device associated with the cache system;
updating the content directory on the volatile memory system based, at least in part, upon the plurality of data requests to reflect changes made to content of the cache system;
processing the plurality of data requests on the electro-mechanical storage device;

storing the plurality of data requests on a tracking queue included within the electro-mechanical storage device until the tracking queue is full or a defined period of time lapses;

upon detecting a failure event, updating the content directory on the volatile memory system with each data request included on the tracking queue; and comparing content stored within the electro-mechanical storage device to related content stored within the cache system to verify that the related content stored within the cache system was processed on the cache system, wherein the non-volatile memory system is a flash memory device and the volatile memory system is a random access memory device.

8. The computer program product of claim 7 further comprising instructions for:

upon detecting the failure event, updating the content directory on the non-volatile memory system based, at least in part, upon the plurality of data requests stored upon the electro-mechanical storage device.

9. The computer program product of claim 7 further comprising instructions for:

when the tracking queue is filled or the defined period of time lapses, providing a notice to the electro-mechanical storage device that the content directory is about to be copied from the volatile memory to the non-volatile memory;

upon notification, marking the tracking queue with a mark to indicate a most recent data request processed on the cache system; and flushing the tracking queue included within the electro-mechanical storage device including deleting content of the tracking queue prior to the mark.

10. The computer program product of claim 7 wherein the cache system is a flash memory cache system.

11. The computer program product of claim 7 wherein the electro-mechanical storage device is included within a storage array.

12. The computer program product of claim 7 wherein the content directory is configured to associate data stored within the cache system with data stored within the electro-mechanical storage device.

13. A computing system including at least one processor and at least one memory architecture coupled with the at least one processor, wherein the computing system is configured to perform operations comprising:

copying a content directory associated with a cache system from a volatile memory system to a non-volatile memory system;

receiving, on the cache system, a plurality of data requests concerning a plurality of data actions to be taken on an electro-mechanical storage device associated with the cache system;

updating the content directory on the volatile memory system based, at least in part, upon the plurality of data requests to reflect changes made to content of the cache system;

processing the plurality of data requests on the electro-mechanical storage device;

storing the plurality of data requests on a tracking queue included within the electro-mechanical storage device until the tracking queue is full or a defined period of time lapses;

upon detecting a failure event, updating the content directory on the volatile memory system with each data request included on the tracking queue; and comparing content stored within the electro-mechanical storage device to related content stored within the cache system to verify that the related content stored within the cache system was processed on the cache system, wherein the non-volatile memory system is a flash memory device and the volatile memory system is a random access memory device.

14. The computing system of claim 13 further configured to perform operations comprising:

upon detecting the failure event, updating the content directory on the non-volatile memory system based, at least in part, upon the plurality of data requests stored upon the electro-mechanical storage device.

15. The computing system of claim 13 further configured to perform operations comprising:

when the tracking queue is filled or the defined period of time lapses, providing a notice to the electro-mechanical storage device that the content directory is about to be copied from the volatile memory to the non-volatile memory;

upon notification, marking the tracking queue with a mark to indicate a most recent data request processed on the cache system; and flushing the tracking queue included within the electro-mechanical storage device including deleting content of the tracking queue prior to the mark.

16. The computing system of claim 13 wherein the cache system is a flash memory cache system.

17. The computing system of claim 13 wherein the electro-mechanical storage device is included within a storage array.

18. The computing system of claim 13 wherein the content directory is configured to associate data stored within the cache system with data stored within the electro-mechanical storage device.

19. A computer-implemented method comprising:

updating a content directory stored within a volatile memory system on a server computer/controller;

processing data requests on a data array;

storing the plurality of data requests on a tracking queue included within the electro-mechanical storage device until the tracking queue is full or a defined period of time lapses;

when the tracking queue is filled, notifying the data array that the content directory is going to be copied from the volatile memory system to a non-volatile memory system;

upon notification, marking the tracking queue to indicate the latest data request processed;

upon completion of the marking process, notifying the server computer/controller that the marking process has been completed; and copying the content directory from the volatile memory system to the non-volatile memory system;

upon detecting a failure event, updating the content directory on the volatile memory system with each data request included on the tracking queue; and comparing content stored within the data array to related content stored within the cache system to verify that the related content stored within the cache system was processed on the cache system, wherein the non-volatile memory system is a flash memory device and the volatile memory system is a random access memory device.

20. The computer-implemented method of claim 19 further comprising:

upon completion of the copying process, notifying the data array that the copying process is complete.

21. The computer-implemented method of claim 19 further comprising:
   deleting the content of the tracking queue prior to the mark.

22. The computer-implemented method of claim 19 wherein the data array includes at least one electro-mechanical storage device.

23. The computer-implemented method of claim 19 further comprising:
   upon detecting the failure event, updating the content directory on the non-volatile memory system based, at least in part, upon the data requests stored within the tracking queue.

\* \* \* \* \*